(12) United States Patent
Drewniak et al.

(10) Patent No.: US 6,770,697 B2
(45) Date of Patent: Aug. 3, 2004

(54) HIGH MELT-STRENGTH POLYOLEFIN COMPOSITES AND METHODS FOR MAKING AND USING SAME

(75) Inventors: Marta Drewniak, Carrollton, TX (US); Xia Zhao, Garfield, NJ (US); Satchit Srinivasan, Carrollton, TX (US)

(73) Assignee: Solvay Engineered Polymers, Grand Prairie, TX (US)

( * ) Notice: Subject to any disclaimer, the term of this patent is extended or adjusted under 35 U.S.C. 154(b) by 154 days.

(21) Appl. No.: 10/072,536

(22) Filed: Feb. 7, 2002

(65) Prior Publication Data

US 2002/0156171 A1 Oct. 24, 2002

Related U.S. Application Data

(60) Provisional application No. 60/269,386, filed on Feb. 20, 2001.

(51) Int. Cl.$^7$ .................................................. C08K 3/34
(52) U.S. Cl. ...................... 524/445; 524/321; 524/425; 524/538; 523/351; 525/70; 264/41; 264/349; 264/540
(58) Field of Search ............................. 524/445, 321, 524/538, 425; 523/351; 525/70; 264/540, 349, 41

(56) References Cited

U.S. PATENT DOCUMENTS

| | | | | |
|---|---|---|---|---|
| 4,810,734 A | * | 3/1989 | Kawasumi et al. .......... | 523/216 |
| 5,164,460 A | | 11/1992 | Yano et al. .................. | 524/445 |
| 5,552,469 A | | 9/1996 | Beall et al. .................. | 524/445 |

(List continued on next page.)

FOREIGN PATENT DOCUMENTS

| | | |
|---|---|---|
| EP | 0 807 659 B1 | 11/1999 |
| EP | 1 055 706 A1 | 11/2000 |
| JP | 51075761 A | 3/1976 |
| WO | WO 00/12572 | 3/2000 |
| WO | WO 01/30864 A2 | 5/2001 |
| WO | WO 01/48080 A1 | 7/2001 |
| WO | WO 02/066553 A2 | 8/2002 |

OTHER PUBLICATIONS

Kato, M.; Usuki, A.; Okada, A., "Synthesis of Polypropylene Oligomer–Clay Intercalation Compounds," *Journal of Applied Polymer Science*, vol. 66, pp. 1781–1785, 1997.

Kawasumi, M.; Hasegawa, N.; Kato, M.; Usuki, A.; and Okada, A., "Preparation and Mechanical Properties of Polypropylene–Clay Hybrids," *Macromolecules*, vol. 30, No. 20, pp. 6333–6338, Aug. 1997.

Hasegawa, N.; Kawasumi, M.; Kato, M.; Usuki, A.; Okada, A., "Preparation and Mechanical Properties of Polypropylene–Clay Hybrids Using a Maleic Anhydride–Modified Polypropylene Oligomer," *Journal of Applied Polymer Science*, vol. 67, pp. 87–92, 1998.

Lau, H.C.; Bhattacharya, S.N.; Field, G.J., "Melt Strength of Polypropylene: Its Relevance to Thermoforming," *Polymer Engineering and Science*, vol. 38, No. 11, Nov. 1998.

(List continued on next page.)

*Primary Examiner*—David W. Wu
*Assistant Examiner*—Henry S Hu
(74) *Attorney, Agent, or Firm*—Winston & Strawn LLP

(57) ABSTRACT

The invention includes a process for preparing an improved melt-strength polyolefin blend by incorporating a polyolefin/clay nanocomposite product. The nanocomposite-modified polyolefin blend is used to form articles through processing operations that involve stretching and/or drawing, such as thermoforming, melt spinning, blow molding and foaming. The addition of the nanocomposite product to the polyolefin blend improves the sag resistance of the polyolefin and broadens the processing window of the operation.

22 Claims, 5 Drawing Sheets

U.S. PATENT DOCUMENTS

| | | | | |
|---|---|---|---|---|
| 5,759,938 | A | | 6/1998 | Cody et al. .................... 502/62 |
| 5,853,886 | A | | 12/1998 | Pinnavaia et al. .......... 428/403 |
| 5,910,523 | A | | 6/1999 | Hudson ...................... 523/213 |
| 5,973,053 | A | * | 10/1999 | Usuki et al. ................ 524/445 |
| 5,985,971 | A | | 11/1999 | Srinivasan et al. ......... 524/425 |
| 6,036,765 | A | | 3/2000 | Farrow et al. .............. 106/487 |
| 6,051,643 | A | | 4/2000 | Hasegawa et al. .......... 524/445 |
| 6,103,817 | A | | 8/2000 | Usuki et al. ................ 524/574 |
| 6,117,541 | A | | 9/2000 | Frisk .......................... 428/327 |
| 6,117,932 | A | | 9/2000 | Hasegawa et al. .......... 524/445 |
| 6,121,361 | A | | 9/2000 | Usuki et al. ................ 524/445 |
| 6,136,908 | A | | 10/2000 | Liao et al. .................. 524/445 |
| 6,153,680 | A | * | 11/2000 | Shah et al. ................. 524/425 |
| 6,225,394 | B1 | | 5/2001 | Lan et al. ................... 524/445 |
| 6,337,046 | B1 | * | 1/2002 | Bagrodia et al. ........... 264/540 |
| 6,380,295 | B1 | | 4/2002 | Ross et al. .................. 524/443 |
| 6,451,897 | B1 | | 9/2002 | Niyogi ....................... 524/445 |
| 6,462,122 | B1 | * | 10/2002 | Qian et al. .................. 524/445 |
| 6,583,209 | B2 | | 6/2003 | Mehta et al. ............... 524/445 |
| 2002/0161096 | A1 | | 10/2002 | Loontjens et al. .......... 524/445 |

OTHER PUBLICATIONS

Hasegawa, N.; Okamoto, H.; Kawasumi, M.; Kato, M.; Tsukigase, A.; Usuki, A., "Polyolefin–clay hybrids based on modified polyolefins and organophilic clay," *Macromolecular Materials and Engineering*, vols. 280/281, pp. 76–79, 2000.

Alexandre, M.; Dubois, P., "Polymer–layered silicate nanocomposites: preparation, properties and uses of a new class of materials," *Materials Science and Engineering*, vol. 28, pp. 1–63, 2000.

Galgali, O., et al., "A Rheological Study on the Kinetics of Hybrid Formation in Polypropylene Nanocomposites," *Macromolecules*, vol. 34, pp. 852–858 (2001).

Kim, K–N, et al., "Mixing Characteristics and Mechanical Properties of Polypropylene–Clay Composites," *ANTEC 2000*, vol. 3, pp. 3782–3786 (2000).

Kodgire, P., et al., "PP/Clay Nanocomposites: Effect of Clay Treatment on Morphology and Dynamic Mechanical Properties," *J. Applied Science*, vol. 81, pp. 1786–1792 (2001).

Kurokawa, Y., et al., "Structure and Properties of a Montmorillonite/Polypropylene Nanocomposite," *J. Materials Science Letters*, vol. 16, pp. 1670–1672 (1997).

Oya, A., "Polypropylene–Clay Nanocomposites," *Wiley Series in Polymer Science*, John Wiley & Sons, Ltd., Chapter 8, pp. 152–172 (2000).

Oya, A., et al., "Factors Controlling Mechanical Properties of a Clay Mineral/Polypropylene Nancomposite," *J. Materials Science*, vol. 35, pp. 1045–1050 (2000).

Reichert, P., et al., "Poly(propylene)/Organoclay Nanocomposite Formation: Influence of Compatibilizer Functionality and Organoclay Modification," *Macromot. Mater. Eng.*, vol. 275, pp. 8–17 (2000).

Solomon, M.J., et al., "Rheology of Polypropylene/Clay Hybrid Materials," *Macromolecules*, vol. 34, pp. 1864–1872 (2001).

Svoboda, P., et al.: "Structure and Mechanical Properties of Polypropylene and Polystyrene/Organoclay Nanocomposites," Department of Chemical Engineering, The Ohio State University, Jun. 25–27, 2001.

* cited by examiner

HIGH MELT-STRENGTH POLYOLEFIN COMPOSITES AND METHODS FOR MAKING AND USING SAME

CROSS REFERENCE TO RELATED APPLICATION

This application claims the benefit of provisional application No. 60/269,386, filed Feb. 20, 2001, the entire contents of which is hereby incorporated herein by express reference thereto.

FIELD OF THE INVENTION

This invention relates to blends including polymer/clay nanocomposite materials containing a polyolefin polymer, a functionalized or grafted polymer, and an organically modified clay material therein, as well as articles made therefrom and processes for stretching and/or drawing such high melt-strength blends.

BACKGROUND OF THE INVENTION

Amorphous polymers, such as acrylonitrile-butadiene-styrene (ABS) and polystyrene, are typically used in industrial processes where stretching and/or drawing of the material is required (i.e., thermoforming, melt spinning, blow molding and foaming.) Polyolefins, including polypropylene (PP) and polyethylene (PE), can potentially replace ABS or polystyrene blends in order to manufacture articles, such as automotive parts, electronic components, fibers, household equipment, containers and bottles, packaging material, and construction equipment. The advantages of polyolefins over ABS or polystyrene blends are improved, long-term ultraviolet and heat resistance, reduced fogging, better recyclability, and lower raw material costs.

To be useful in such industrial processes, the polymer material must exhibit sufficient elastic behavior to resist sagging, but remain viscous enough to flow into the mold under stress. One advantage of ABS and polystyrene is that their rubbery elastic state exists over a wider temperature range compared to that of the semi-crystalline polyolefins. Due to their sharp melting point, polyolefins such as polypropylene pass through the viscoelastic plateau very rapidly on heating, resulting in poor melt strength and sag. In thermoforming, for example, deformations in the thermoformed sheet caused by sagging may in turn lead to irregularities in articles made by the process, such as unacceptable variations in weight and thickness, which may even result in tearing of the sheet.

To address the problems associated with thermoforming polyolefins, Japanese Patent Publication No. 51-75761, published in June, 1976, discloses a polypropylene sheet laminated onto a sagging-free sheet of a resin different from polypropylene in attempts to solve the problem of sagging; however, this may be unsuitable for general use since it raises problems as to lamination means, selection of resins used and the like. WO 00/12572 details a long-chain branched polypropylene with high melt strength and good processability formed by contacting propylene monomers in a reactor with an inert hydrocarbon solvent and one or more single site catalysts capable of producing stereospecific propylene at 40–120° C. However, the use of this high-melt-strength polypropylene (HMS-PP) gives only limited improvements, since it affects only one component of the polyolefin compound (i.e., polypropylene). It is currently recognized, for example, in Lau et al., Polymer Eng. Sci. 38 (1998), page 1915, that for a material to have good thermoformability, it must exhibit high melt strength.

Nancomposites are a new class of composites that are particle-filled polymers for which at least one dimension of the dispersed particle is in the nanometer range ($10^{-9}$ meter). Because of the size of the dispersed particles, the nanocomposites exhibit modified mechanical, thermal and optical properties as compared to pure polymers or conventional composites.

The most commonly used and investigated types of polymer nanocomposites are those based on clays and layered silicates. The nanocomposites are obtained by the intercalation or penetration of the polymer (or a monomer subsequently polymerized) inside the galleries of layered clay material and the subsequent exfoliation or dispersion of the intercalate throughout the final polymer blend. To be more compatible with organic polymers, the layered clay material is usually modified by an ion exchange process with cationic surfactants, such as alkylammonium or alkylphosphonium ions.

The great difficulty when using clay in a polyolefin matrix is the opposing nature of the materials. The polymeric portion of the matrix is usually a nonpolar organic material, whereas the clay is a much more polar inorganic material. This incompatibility hinders the direct intercalation or exfoliation of the clay in the final polymer blend. See, for example, Alexandre et al., Mater. Sci. Eng. Rpts. 28 (2000), page 1. To introduce favorable interactions between the polymer and the layered clay material, a functionalized polyolefin such as a maleic-anhydride-modified polypropylene must be added to the composite. This method has been reported in Kawasumi et al., Macromolecules 30 (1997), page 6333.

Increased interest in developing a polymer/clay nanocomposite to improve the stiffness/impact balance of polyolefins has been reported. See, for example, Hasegawa et al., J. App. Pol. Sci. 67 (1998), page 87. No applications have been commercialized at the present time, however, presumably as a result of the lack of direct intercalation or exfoliation of the organically modified clay in the polyolefin matrix that renders such materials difficult to prepare.

U.S. Pat. No. 5,552,469 describes the preparation of intercalates derived from certain clays and water soluble polymers, such as polyvinyl alcohol and polyacrylic acid. Although the specification lists a wide range of resins including polyesters and rubbers that can be used in blends with these intercalates, there is no teaching of how to make such blends. Further, the water soluble polymer/clay mixture is taught to be incompatible with hydrophobic polyolefins (i.e., all blends containing polypropylene).

U.S. Pat. No. 5,910,523 describes a process wherein the clay layer is functionalized with an aminosilane and then grafted to a carboxylated or maleated polyolefin through an amine-carboxyl reaction. The use of xylene solvent in this process, however, makes the method cumbersome, environmentally unfriendly, and expensive to commercialize.

U.S. Pat. No. 6,121,361 describes a process wherein a composite clay material is formed of a clay mineral having an interlayer section by first bonding a swelling agent such as an onium ion having 6 or more carbon atoms to the clay mineral via an ionic bond for expanding the interlayer section and rendering the interlayer section compatible with an organic molecule, and then introducing a polymer having a polar group in a main chain and/or a side chain. Degradation of the mechanical properties of the composites, however, can occur whenever excess amounts of the swelling agent precipitates out of solution.

U.S. Pat. No. 6,153,680 discloses a composition useful for automotive interior parts which includes a blend of polypropylene, an uncrosslinked ethylene copolymer, an ionomer, a crosslinking agent and a silicone elastomer. Clay fillers in the nanometer-size range are listed as optional fillers, but there is no teaching that the use of such fillers improves the mechanical properties of the blend and no teaching of the details of any such filled-blends.

Moreover, none of the prior art references described above teaches the surprising discovery of the present invention, i.e., that the addition of polymer/clay nanocomposites to such polyolefins improves the melt strength of the final polymer blend. Thus, there remains a need to develop processes using polyolefins in thermoforming, melt spinning, blow molding, and foaming, and the improved articles resulting from the processes of the invention.

SUMMARY OF THE INVENTION

The invention encompasses methods of manufacturing an article by providing a polyolefin/clay nanocomposite masterbatch formed from about 0 to 99 percent by weight of polyolefin, from about 1 to 100 percent by weight of functionalized polyolefin, and from about 10 to 50 percent by weight based on the total masterbatch of an organically modified clay, melt blending from about 1 to 30 percent by weight of the nanocomposite masterbatch and from about 70 to 99 percent by weight of a polyolefin blend to form a final polyolefin blend and to ensure sufficient exfoliation of the organically modified clay into the final polyolefin blend so that the melt strength of the final polyolefin blend is greater than the melt strength of the polyolefin blend before modification with the nanocomposite masterbatch, and forming the article using the final polyolefin blend.

In one embodiment, the masterbatch present in an amount from about 2 to 27 percent by weight and which includes from about 50 to 80 percent by weight of polyolefin, from about 20 to 50 percent by weight of functionalized polyolefin, and from about 20 to 48 percent by weight of organically modified clay, and the polyolefin blend present in an amount from about 73 to 98 percent by weight, are melt blended to form the final polymer blend which has a modified melt strength so that the ratio of the modified melt strength to the melt strength before modification measured at 220° C. is at least about 1.5 but no more than about 15. In a preferred embodiment, the masterbatch present in an amount from about 3 to 25 percent by weight and which includes from about 60 to 70 percent by weight of polyolefin, from about 30 to 40 percent by weight of functionalized polyolefin, and from about 30 to 45 percent by weight of organically modified clay wherein the amounts total to 100 percent, and the polyolefin blend present in an amount from about 75 to 97 percent by weight are melt blended to form the final polyolefin blend which has a modified melt strength so that the ratio of the modified melt strength to the melt strength before modification measured at 220° C. is at least about 1.6 but no more than about 14 and the final polyolefin blend has a shear viscosity that is at least about 5 times that of the shear viscosity of the polymer blend measured under the same conditions but without the organically modified clay.

The invention also encompasses methods of manufacturing an article which includes a polyolefin/clay nanocomposite blend by forming a final polymer blend. This method includes combining from about 50 to 98 percent by weight of a polyolefin, from about 1 to 20 percent by weight of a functionalized polyolefin, and an organically modified clay in an amount sufficient to provide a modified melt strength, so that a ratio of the modified melt strength to the melt strength before modification measured at 220° C. is at least about 1.5 but no more than about 15, and forming the article using the polyolefin/clay nanocomposite blend.

In one embodiment, the polyolefin blend in the article includes from about 70 to 95 percent by weight of polyolefin, from about 1 to 10 percent by weight of functionalized polyolefin, and from about 4 to 20 percent by weight of organically modified clay to provide a ratio of the melt strength of the modified blend to the melt strength of the blend before modification measured at 220° C. of at least about 1.6 but no more than about 14. In a preferred embodiment, the polyolefin blend in the article includes from about 85 to 92 percent by weight of polyolefin, from about 2 to 5 percent by weight of functionalized polyolefin, and from about 6 to 10 percent by weight of organically modified clay, wherein the total amoutns to 100%, to provide a ratio of the melt strength of the modified blend to the melt strength of the blend before modification measured at 220° C. of at least about 1.6 but no more than about 14.

In either method of forming articles, the forming can include at least one of thermoforming, extrusion, melt spinning, blow molding or foam processing.

The invention also encompasses articles formed from a final polyolefin blend containing a polyolefin/clay nanocomposite masterbatch including from about 0 to 99 percent by weight of polyolefin, from about 1 to 100 percent by weight of a functionalized polyolefin, and from about 10 to 50 percent by weight based on the final polyolefin blend of an organically modified clay, and any optional components, wherein the final polyolefin blend includes from about 1 to 30 percent by weight of the nanocomposite masterbatch and about 70 to 99 percent by weight of a polyolefin blend, and wherein the organoclay is sufficiently exfoliated into the polyolefin blend to provide the final polyolefin blend with a modified melt strength so that the ratio of the modified melt strength to the melt strength before modification measured at 220° C. is at least about 1.5 but no more than about 15.

In one embodiment, the masterbatch is present in an amount from about 2 to 27 percent by weight and includes from about 50 to 80 percent by weight of polyolefin, from about 20 to 50 percent by weight of functionalized polyolefin, and from about 20 to 48 percent by weight of organically modified clay, and the polyolefin blend is present in an amount from about 73 to 98 percent by weight, to form the final polymer blend which has a modified melt strength so that the ratio of the modified melt strength to the melt strength before modification measured at 220° C. is at least about 1.5 but no more than about 15. In a preferred embodiment, the masterbatch is present in an amount from about 3 to 25 percent by weight and includes from about 60 to 70 percent by weight of polyolefin, from about 30 to 40 percent by weight of functionalized polyolefin, and from about 30 to 45 percent by weight of organically modified clay, and the polyolefin blend is present in an amount from about 75 to 97 percent by weight, to form the final polyolefin blend which has a modified melt strength so that the ratio of the modified melt strength to the melt strength before modification measured at 220° C. is at least about 1.6 but no more than about 14 and the final polyolefin blend has a shear viscosity that is at least about 5 times that of the shear viscosity of the polymer blend measured under the same conditions but without the organically modified clay.

In one embodiment, the functionalized polyolefin includes a homopolymer, copolymer, and/or mixture of ethylene and/or propylene, wherein a functional monomer with a pendant reactive polar group is grafted onto the polyolefin. In another alternative or additional embodiment, the nanocomposite-modified polyolefin blend further includes one or more optional additive components including nucleating agents, fillers, plasticizers, impact modifiers, colorants, mold release agents, lubricants, antistatic agents, pigments, fire retardants, and ultraviolet stabilizers, or mixtures thereof. The addition of the nanocomposite masterbatch provides a range of temperatures for forming the article that is at least about 10° C. greater than without the inclusion of a sufficient amount of the clay nanocomposite.

The invention also encompasses articles formed from a modified polyolefin blend including from about 50 to 98 percent by weight of polyolefin, from about 1 to 20 percent by weight of functionalized polyolefin, and from about 1 to 30 percent by weight of organically modified clay that is sufficiently dispersed in the polyolefin and functionalized polyolefin to provide a modified melt strength that is greater than the melt strength of the blend before modification.

In one embodiment, the polyolefin blend includes from about 70 to 95 percent by weight of polyolefin, from about 1 to 10 percent by weight of functionalized polyolefin, and from about 4 to 20 percent by weight of organically modified clay. In a preferred embodiment, the polyolefin blend includes about 85 to 92 percent by weight of polyolefin, from about 2 to 5 percent by weight of functionalized polyolefin, and from about 6 to 10 percent by weight of organically modified clay. In one embodiment, the polyolefin blend has a ratio of the melt strength of the modified blend to the melt strength of the blend before modification measured at 220° C. of at least about 1.5 but no more than about 15. In a preferred embodiment, the polyolefin blend has a ratio of the melt strength of the modified blend to the melt strength of the blend before modification measured at 220° C. of at least about 1.6 but no more than about 14.

The organically modified clay preferably includes a reaction product of at least one organoclay and at least one swelling agent. The swelling agent can include at least one of cationic surfactants; amphoteric surface active agents; derivatives of aliphatic, aromatic or arylaliphatic amines, phosphines and sulfides; organosilane compounds; protonated amino acids and salts thereof; and combinations thereof.

The invention also encompasses an automotive component, a building material, a packaging material, an electrical material, or a nonwoven fabric or fiber formed from the articles described above.

BRIEF DESCRIPTION OF THE DRAWINGS

Further features and advantages of the invention can be ascertained from the following detailed description that is provided in connection with the drawing(s) described below.

DETAILED DESCRIPTION OF THE PREFERRED EMBODIMENTS

Figure 1:
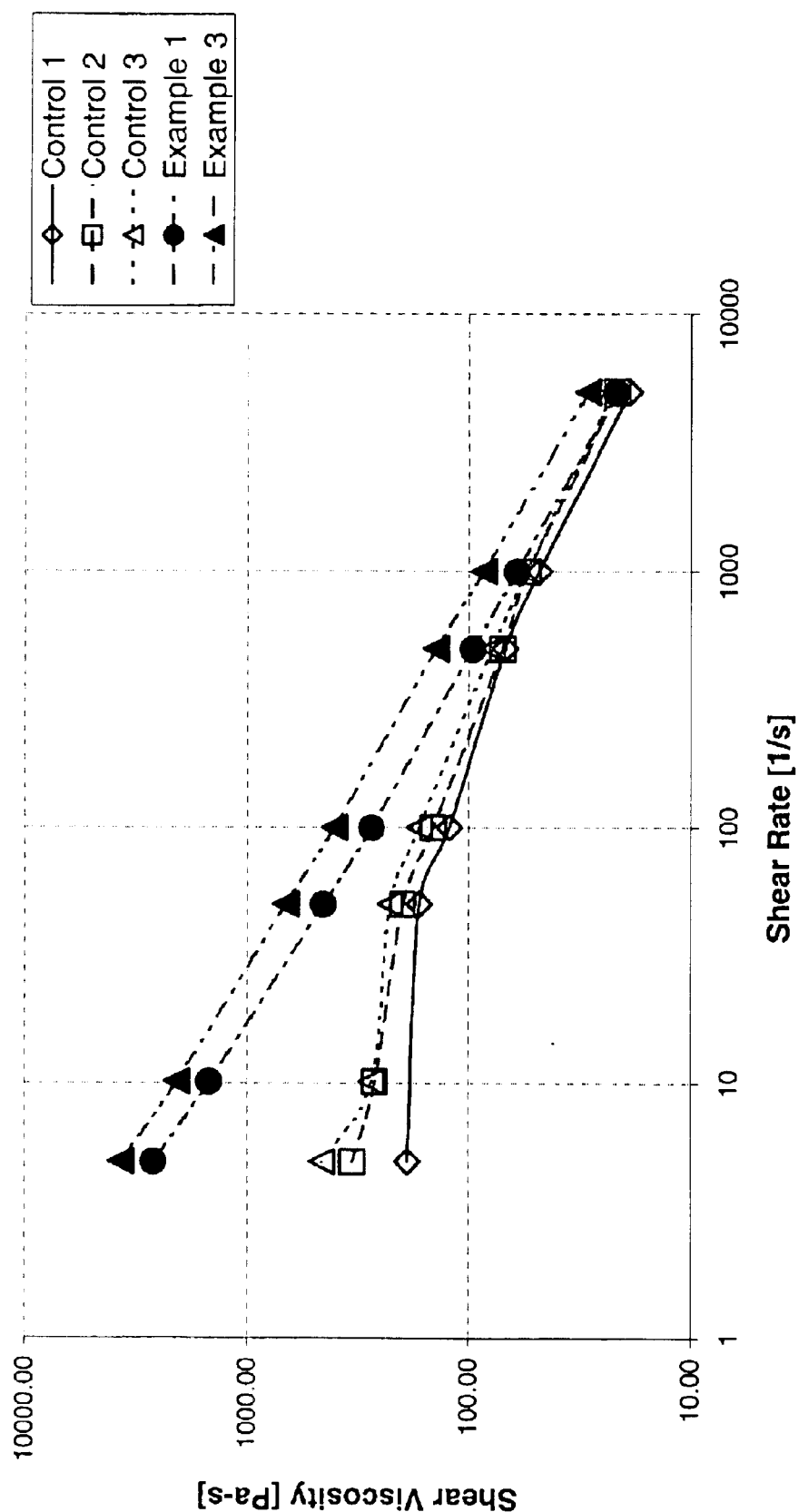
FIG. 1 is a graphical depiction of viscosity versus shear rate for a masterbatch of the current invention and for controls.

It has now been discovered that melt strength in polyolefin/functionalized polyolefin final blends can be improved by including clay nanocomposites therein. The current invention involves melt-strength polyolefin blends containing a polyolefin/clay nanocomposite, methods of using such blends for manufacturing articles through conventional industrial processes, such as thermoforming, extrusion, melt spinning, blow molding or foaming, that involve stretching and/or drawing, and the resultant articles. The thermoforming process, for example, requires that a material be pre-heated without sagging under the force of gravity and then stretched over a thermoforming mold without tearing.

Thus, the present invention can provide one or more of the following advantages: improved melt strength of polyolefin blends; increased sag resistance of polyolefin blends; maximized range of operating temperatures during processing; ability to thermoform polyolefin sheets with less variation in weight and thickness; and minimized polymer sheet deformation and distortion.

In each of the processes noted herein, the melt strength of the final polymer tends to be critical to its success, since the melted and/or softened polymer must retain its intended shape while being handled and/or cooled. Melt strength is the characteristic that keeps a polymeric material from exhibiting tearing or excessive deformation when subjected to stress while in the melted state. The melt strength of a polymer is determined by a Gottfert™ Rheotens Melt Tension instrument Model 10.1 which measures the force in centi-Newtons (cN) required to pull a polymer melt strand from a capillary die at constant acceleration.

In addition to increased melt strength, the processing window of the heating step in these commercial processes must include a broad enough range of temperatures to ensure the practicality of the use of the composite in industrial applications. The processing window is defined as the range of temperatures at which a material has a characteristic that allows for a given process to be performed. Pure polypropylene, for example, can only be thermoformed in the range of temperatures between 143°–166° C., representing a very narrow processing window. On the other hand, ABS has a wider processing temperature window of 127° C.–182° C.

It has now been discovered that the polyolefin/clay nanocomposites of the invention surprisingly exhibit very high viscosity under low shear rates. Shear rate is defined as the rate at which a material is undergoing deformation, or movement, in response to a shear stress, which is the force applied to a material to cause flow. Shear rate is expressed in reciprocal seconds (1/s). A low shear rate is less than or equal to 10 1/s, while a high shear rate is greater than 900 1/s. This high viscosity under low shear rates translates into a high melt strength for the blend as a whole. The improved melt strength, in turn, helps increase the range of acceptable temperatures available for many beneficial industrial applications. It should be understood that masterbatches of the present invention have a higher melt strength than the final polymer blends, and that dilution into a final polymer blend reduces the higher melt strength to a melt strength that is still significantly higher than conventional polymer blends lacking the polyolefin/functionalized polyolefin/clay nanocomposite structure of the invention.

The incorporation of a polyolefin/clay nanocomposite into the final polymer blend is important in any manufacturing process that requires stretching and/or drawing according to the invention. Any suitable method of incorporation can be used. The preferred method of incorporation can either be: by adding a masterbatch of polyolefin/clay nanocomposite to a final polymer blend; or by exfoliating the organically modified clay directly into a polymer matrix containing, for example, an impact-modified polypropylene; or both. Both the masterbatch and the directly compounded polyolefin blend contain a polyolefin; a polyolefin functionalized with a hydrophilic moiety; and an organically modified clay (also referred to herein as "organoclays").

Any suitable polyolefin can be used, particularly those having narrow processing windows or low melt strength. Preferably, the polyolefin includes $C_2$ to $C_{20}$ polyolefins. The more preferred polyolefin of the polyolefin/clay nanocomposite in the present invention includes be a homopolymer or copolymer of ethylene; a homopolymer or copolymer of propylene; a copolymer of ethylene and an alpha-olefin; a terpolymer of ethylene, an alpha-olefin and a diene; a styrene copolymer of ethylene or propylene; or mixtures thereof.

Similarly, any suitable functionalized polyolefin can be used as the functionalized polyolefin component of the invention, including those polyolefins described above but including functionalization (e.g., grafting). Preferably, the functionalized polyolefin can also be a homopolymer, copolymer, and/or mixture of ethylene and/or propylene. The functionalized polyolefin preferably contains one or more types of polar moieties that are either grafted onto the polyolefin base or copolymerized with the polyolefin. Preferably, the one or more polar moieties are grafted onto the polyolefin base as a pendant reactive polar group. Any unsaturated carboxylic acid monomer that provides a polar moiety can be used in the manufacture of functionalized polyolefins of this invention. Representative unsaturated organic compounds that contain at least one carbonyl group include the ethylenically unsaturated carboxylic acids, anhydrides, esters, and their salts. Representative compounds include maleic, fumaric, acrylic, methacrylic, itaconic, crotonic, alpha-methyl crotonic, cinnamic, and the like, acids and their anhydride, ester and salt derivatives, if any. Additional unsaturated organic compounds and other compounds available to those of ordinary skill in the art may also be used, as well as combinations of functionalizing compounds, such as methacrylate-vinyl acetate mixtures or acrylic acid/methacrylic acid mixtures. Preferably, maleic anhydride, acrylic acid, methacrylic acid, or combinations thereof are used. More preferably, maleic anhydride is used.

An unsaturated hydrophilic organic compound can be grafted to the base polymer by any technique known to one of ordinary skill in the art, such as those taught in U.S. Pat. No. 3,236,917 and U.S. Pat. No. 5,194,509, both of which are incorporated herein by express reference thereto. For example, in the '917 patent, the base polymer is introduced into a two-roll mixer and mixed at a temperature of 60° C. The unsaturated organic compound is then added along with a free radical initiator, such as benzoyl peroxide, and the components are mixed at 30° C. until the grafting is completed. In the '509 patent, the procedure is similar except that the reaction temperature is higher, e.g., 210° to 300° C., and a free radical initiator is not used. Such functionalized polyolefins are also available from Crompton Corporation (formerly Uniroyal Chemical Company) of Greenwich, Conn. under the trademark Polybond and from Eastman Chemical Company of Kingsport, Tenn. under the trademark Epolene.

The organically modified clays of the present invention may be prepared by any available methods, preferably from any suitable, swellable, layered clay mineral including natural or synthetic phyllosilicates, particularly smectite clays such as montmorillonite, nontronite, beidellite, hectorite, saponite, sauconite, vermiculite and the like, as well as magadiite, kenyaite, stevensite, halloysite, aluminate oxides, hydrotalcite, and the like, and combinations thereof. Typically, the swellable clays have a negative charge on the surface, preferably of at least about 20 milliequivalents, preferably at least about 50 milliequivalents, and more preferably from about 50 to 150 milliequivalents, per 100 grams of the layered clay material.

Certain clays can be treated with organic molecules that are capable of being absorbed within the clay material, e.g., between layers of clay, thereby expanding (swelling) the volume of the clay. For example, the space between adjacent layers can be expanded from about 0.4 nanometers (nm) or less to at least about 1 nanometer or even more. Although the clay can have any cation exchange capacity, the clay must still be able to properly expand. Preferably, the cation exchange capacity of the clay is at least about 20 milliequivalents/100 grams since organic molecules are not exchanged as well at lower cation exchange capacities and will have reduced expansion of the clay. Preferably, the cation exchange capacity is no more than about 200 milliequivalents/100 grams. If the exchange capacity exceeds about 200 milliequivalents/100 grams, the bonding strength between the clay mineral layers becomes fairly strong and it becomes more difficult to expand the clay.

"Organically modified clay," as used herein, refers to a clay that has been modified by the addition of a swelling agent. Any organic molecules suitable as swelling agents may be used. Preferably, the swelling agents include cationic surfactants, for example including ammonium, phosphonium or sulfonium salts; amphoteric surface active agents; derivatives of aliphatic, aromatic or arylaliphatic amines, phosphines and sulfides; and organosilane compounds; and combinations thereof. Other suitable swelling agents include protonated amino acids and salts thereof containing 2–30 carbon atoms, such as 12-aminododecanoic acid, epsilon-caprolactam, and like materials, as well as any combinations thereof. This process of swelling the clay, particularly layered clay, known as intercalation, results in the development of intercalates (stacks) which are more organophilic and which can be more readily exfoliated (dispersed) during admixture with a polymer to form a polymer/clay nanocomposite. These clay intercalates are often about 1 nanometer thick, but about 100 to 1,000 nanometers across. This high aspect ratio, and the resulting high surface area, helps provides high reinforcement efficiency at low loading levels. In one embodiment, the clays of the invention are preferably at least substantially exfoliated (dispersed) throughout the polyolefin/functionalized polyolefin polymer matrix, and more preferably are completely exfoliated throughout the polymer matrix.

The clay mineral or other layered silicate can be organically modified by any technique known to one of ordinary skill in the art, such as those taught in U.S. Pat. Nos. 5,728,764, 4,810,734 and 3,671,190, each of which is incorporated herein by express reference thereto. However, it is not intended that these methods be limited to any specific process or procedure. Organoclays are also available commercially from Nanocor, Inc. of Arlington Heights, Ill. under the trademark Nanomer and from Southern Clay Products, Inc. of Gonzales, Tex. under the trademark Closite.

However, treating the hydrophilic clay to increase its organophilic aspect tends to be insufficient to generate a reaction with nonpolar polyolefins. Most reports of increased mechanical properties using nanocomposites have been obtained by utilizing the more reactive polyamides in the polymer matrix. In order to incorporate the use of polyolefins, the polarity of the polymer matrix is preferably enhanced by adding a functional monomer with a pendant reactive polar group to a small percentage of the polyolefin blend, as described above. The functionalized monomer, such as a maleic anhydride group, reduces interfacial tension and partly acts as a nucleating agent for the main polyolefin component of the nanocomposite. The reactive polar group on the functionalized polyolefin also interacts with the highly polar organoclays, serving to increase the distance between the clay layers and increasing the potential of exfoliation into the polyolefin/clay nanocomposite, as well as the final polymer blend.

The polyolefin/clay nanocomposite may be incorporated into the final polymer blend in a two-step mixing process by adding a masterbatch of polyolefin/clay nanocomposite to the final polymer blend. The polymeric portion of the nanocomposite masterbatch typically includes from about 0 to 99 wt % of polyolefin and from about 1 to 100 wt % of functionalized polyolefin, preferably from about 50 to 80 wt % of polyolefin and from about 20 to 50 wt % of functionalized polyolefin, and more preferably from about 60 to 70 wt % of polyolefin and from about 30 to 40 wt % of functionalized polyolefin. The amount of layered clay material may vary widely but generally can be about 10 to 50 wt % of the total mixture of polyolefin blend and nanocomposite clay (the "nanocomposite mixture"), preferably from about 20 to 48 wt % of the total nanocomposite mixture, and more preferably from about 30 to 45 wt % of the total nanocomposite mixture. Preferably, the clay material delaminates to form layers or stacks of layers that are substantially homogeneously dispersed in the polymer matrix. In general, at least about 50 wt %, preferably at least about 70 wt %, more preferably at least about 80 wt % of the clay material delaminates. In one more preferred embodiment, at least about 90 wt % of the clay delaminates.

The final polymer blend can include, for example, from about 1 to 30 percent by weight of the nanocomposite masterbatch and from about 70 to 99 percent by weight of a polyolefin blend. In another embodiment, the final polymer blend can include from about 2 to 27 percent by weight of the masterbatch and from about 73 to 98 percent by weight of a polyolefin blend. In yet another embodiment, the final polymer blend can include from about 3 to 25 percent by weight of the masterbatch and from about 75 to 97 of a polyolefin blend.

Such a masterbatch has higher shear viscosity at low shear rates than straight polypropylene or conventionally filled polypropylene. The masterbatch shear viscosity at 10 l/s, a low shear test, and at 60° C. over the melting point of the polymer (i.e., typical peak melting temperature of polypropylene is approximately 165° C.) should be a factor of at least about 5, preferably a factor of at least about 8, over the viscosity of the polymer at the same conditions without the addition of the layered clay material. For example, if the polymer without the clay has a viscosity at 230° C. of about 300 Pascal seconds (Pa·s) at 10 l/s, the viscosity of the masterbatch should be at least about 1500 (Pa·s). The absolute value will, of course, depend on the viscosity of the base polymer.

Any available technique for using a polymer masterbatch to form a final polymer blend that is available to those of ordinary skill in the art may be used according to the invention. The final polymer blend can contain, for example, from about 1 to 10 weight percent of the clay nanocomposite, i.e., after the masterbatch has been formed into the final polymer blend.

In another embodiment, the individual components of the polyolefin/clay nanocomposite can be added directly to the final polymer blend in one step, provided that significant clay exfoliation is achieved in the compound. Surprisingly, the interlayer section of the clay mineral in some cases is sufficiently expanded in a one-stage mixing. As a result, an increase in low shear viscosity is observed, as well as improvement in melt strength and sagging resistance, from simply combining the polyolefin component, functionalized polyolefin component, and clay nanocomposite. The final polymer blend containing the polyolefin/clay nanocomposite includes from about 50 to 98 percent by weight (wt %) of polyolefin, from about 1 to 20 wt % of functionalized polyolefin, and from about 1 to 30 wt % of organically modified clay. In one embodiment, the final polymer blend containing the polyolefin/clay nanocomposite includes from about 70 to 95 wt % of polyolefin, from about 1 to 10 wt % of functionalized polyolefin, and from about 4 to 20 wt % of organically modified clay. In another embodiment, the final polymer blend containing the polyolefin/clay nanocomposite includes from about 85 to 92 wt % of polyolefin, from about 2 to 5 wt % of functionalized polyolefin, and from about 6 to 10 wt % of organically modified clay.

The final polymer blend may include various optional components which are additives commonly employed with polymers. Such optional components include nucleating agents, thermal stabilizers, mineral fillers, plasticizers, impact modifiers, colorants, mold release agents, lubricants, antistatic agents, pigments, fire retardants, conductive fillers, ultraviolet stabilizers and the like. These can be added for any of a variety of reasons, as desired and as readily determined by those of ordinary skill in the art, e.g., as processing aids, to improve or obtain desired characteristics, for cost considerations, or the like.

Preferred mineral fillers include, but are not limited to, talc, ground calcium carbonate, precipitated calcium carbonate, precipitated silica, precipitated silicates, precipitated calcium silicates, pyrogenic silica, hydrated aluminum silicate, calcined aluminosilicate, clays, mica, and wollastonite, and combinations thereof.

Foaming agents can be included in the mixture to produce foamed articles. The expanding medium, or foaming agent, can include a physical foaming agent or a chemical foaming agent. A physical foaming agent is a medium expanding composition that is a gas at temperatures and pressures encountered during the foam expanding step. Typically, a physical foaming agent would be introduced to the polymer blend in the gaseous or liquid state and expands, for example, upon a rapid decrease in pressure. A chemical foaming agent is a compound or mixture of compounds that decompose at elevated temperatures to form one or more gases, which can be used to expand the polymer blend into a foam.

Melt blending is one method for preparing the polyolefin/clay nanocomposite and for incorporating the nanocomposite into the final polymer blend of the present invention. Techniques for melt blending of a polymer with additives of all types are known in the art and can typically be used in the practice of this invention. Typically, in a melt blending operation useful in the practice of the present invention, the individual components of the composite are combined in a mechanical extruder or mixer, and then heated to a temperature sufficient to form a polymer melt. The mechanical mixer can be a continuous or batch mixer. Examples of suitable continuous mixers include single screw extruders, intermeshing co-rotating twin screw extruders such as Werner & Pfleiderer ZSK™ extruders, counter-rotating twin screw extruders such as those manufactured by Leistritz™, and reciprocating single screw kneaders such as Buss™ co-kneaders. Examples of suitable batch mixers include lateral 2-roll mixers, such as Banbury™ or Boling™ mixers.

The composite may be prepared by shear mixing the polyolefin blend and the clay material in the melt at a temperature equal to or greater than the melting point of the polymer. Melting point is defined as the first order transition temperature at which a crystalline solid changes from a solid state to a fluid state. The temperature of the melt, residence time of the melt within the mixer, and the mechanical design of the mixer are several variables that control the amount of shear to be applied to the composition during mixing. The melt of the polyolefin blend and the clay material is subjected to shear mixing until the desired amount of material exfoliates or delaminates to the desired extent.

Alternatively, the polyolefin blend may be granulated and dry-mixed with the organoclay, and thereafter, the composition heated in a mixer until the polymer is melted to form a flowable mixture. This flowable mixture can then be subjected to a shear in a mixer sufficient to form the desired composite. The polymer may also be heated in the mixer to form a flowable mixture prior to the addition of the clay material and then subjected to a shear sufficient to form the desired composite. The amount of the intercalated clay material most advantageously incorporated into the polyolefin is dependent on a variety of factors, including the specific clay material and polymer used to form the composite as well as its desired properties. This will be readily determinable by one of ordinary skill in the art, particularly with reference to the teachings herein.

In a preferred embodiment, a polyolefin/clay nanocomposite masterbatch is prepared by mixing the nanocomposite components, i.e., the polyolefin, the functionalized polyolefin, and the organically modified clay, in a modular intermeshing co-rotating twin-screw extruder, such as those manufactured by Leistritz™. Other manufacturers of this type of equipment include co-rotating twin screw extruders from Berstorff™, Werner and Pfleiderer™, Japanese Steel Works, and others. The screw diameter for this type of mixer may vary from about 25 to 300 mm. Commercially viable production rates of the final polymer blend of the current invention are achievable with screw diameters of at least about 70 mm.

A description of a suitable conventional extruder for performing the processes of the present invention can be found in U.S. Pat. No. 4,857,600 and includes of a series of sections, or modules, which perform certain mixing functions on the composition. The nanocomposite components are fed into the initial feed section of the extruder at the main feed hopper. Other ingredients, such as fillers, thermal stabilizers, and others described herein, may also be fed into the feed hopper of the extruder as dry powders or liquids.

The components of the nanocomposite master batch are typically homogenized within an initial melting and mixing section of the extruder. The polymer melt temperature is typically raised by a sequence of kneading blocks to just above the highest softening point of the polymer blend. Within this first mixing section of the extruder, it is desirous to maintain the polymer temperature above the melting point of the polymer blend within the time frame of the melting process for a sufficient time to permit the components to properly combined. For example, about 5 to 20 seconds will be suitable for most components selected according to the invention. A melt temperature of about 160° C. to 180° C. is preferred for the first mixing section.

Subsequent to the first mixing section, there is typically a second mixing section of the extruder to perform kneading and distributive mixing to help ensure sufficient exfoliation of the layered clay material in the polyolefin blend. The mixing temperature in this section should be from about 160° C. and 225° C. for most components, preferably from about 170° C. and 200° C., in order to bring about sufficient exfoliation of the layered clay material in the polyolefin blend. The residence time within a second mixing section should typically be at least about 10 seconds, but no more than about 100 seconds to prevent excessive thermal degradation, for most polyolefin components.

The final section of the mixing extruder is typically melt compression prior to extrusion through a die plate. The melt compression can be accomplished with the co-rotating twin screw extruder, or melt compression can be done via a de-coupled process such as a single screw extruder or a melt gear pump. At the end of the compression section, the composition is discharged through a die plate.

The improved melt strength polyolefin/clay nanocomposite composition may be pelletized via strand pelleting or commercial underwater pelletization. Pellets of the composition are then used to manufacture articles through processing operations, such as thermoforming, that involve stretching and/or drawing. Similar industrial processes involving stretching and/or drawing include extrusion, blow molding, melt spinning or foam processing.

In extrusion, for example, a plastic sheet extrusion system is fed by one or more extruders feeding a sheet extrusion die. The die is closely followed by a roll cooling system. The resulting partially cooled sheet is further cooled on a roller conveyor of finite length. No particular limitation is imposed on the method of extrusion, and various known methods can be employed to handle the intermediates and end products of the invention. The process of extrusion is well known to those of ordinary skill in the art, e.g., as described in detail in Rauwendaal, "Polymer Extrusion" (ISBN 0-19-520747-5) Hanser Publications, New York (1990).

In foam processing, a structure that must hold its shape is developed from melted polymer by the use of blowing agents. U.S. Pat. No. 4,323,528, hereby incorporated herein by express reference thereto, relates making polyolefin foams via an accumulating extrusion process. The process includes: 1) mixing a thermoplastic material and a blowing agent to form a polymer gel; 2) extruding the gel into a holding zone maintained at a temperature and pressure that does not allow the mixture to foam; the holding zone has a die defining an orifice opening into a zone of lower pressure at which the gel foams and an openable gate closing the die orifice; 3) periodically opening the gate; 4) substantially concurrently applying the mechanical pressure by means of a movable ram on the gel to eject it from the holding zone through the die orifice into the zone of lower pressure; and 5) allowing the ejected gel to expand to form the foam. The process of foam processing is well known to those of ordinary skill in the art and is described in detail in Frisch, "Plastic Foams" (ISBN 0-82-471218-8) Marcel Dekker, New York (1972).

Thermoforming is the process of heating a plastic material in sheet form to its particular processing temperature and forming the hot and flexible material against the contours of a mold by mechanical or pneumatic means. When held to the shape of the mold and allowed to cool, the plastic at least substantially retains the shape and detail of the mold. The process of thermoforming is well known to those of ordinary skill in the art and is described in detail in Throne, "Thermoforming" (ISBN 0-02-947610-0) Hanser Gardner Publications, Cincinnati (1987).

In blow molding, air pressure is used to expand the melted polymer into hollow shapes. The principal advantage of this process is its ability to produce hollow shapes without having to join two or more separately molded parts. The process of blow molding is well known to those of ordinary skill in the art and is described in detail in Rosato, "Blow Molding Handbook" (ISBN 0-19-520761-0) Hanser Publications, New York (1989).

In the process of melt spinning, a polymer melt is formed into filaments by extrusion through a spinnerette and simultaneously applying an extensional force to the extrudate. As the extrudate thins down, it solidifies on cooling below its melt temperature and transforms into a filament. The process of melt spinning is well known to those of ordinary skill in the art and is described in detail in Ahmed, "Polypropylene Fibers—Science and Technology" (ISBN 0-444-42090-8) Elsevier Scientific Publishing Company, New York (1982).

Each of the above-described processes are among those available to the ordinary-skilled artisan for use in forming articles according to the invention. Any article can be manufactured. For example, articles that can be manufactured from the current invention include interior automotive components such as instrument panel skins and door panel skins, appliance housings, building materials such as thermal and sound insulation, packaging materials, electrical and electronics materials, and nonwoven fabrics and fibers.

Polyolefin blends typically do not have sufficient melt strength or sag resistance to be used in industrial processes such as thermoforming. The melt strength is determined here by the Gottfert™ Rheotens Melt Tension instrument Model 10.1 noted above. In this test, a polymer melt strand extruded vertically downwards from a capillary die was drawn by rotating rollers whose velocity increased at a constant acceleration rate. The polymer melt being stretched undergoes uniaxial extension. The melt strength parameter did not give a well-defined rheological property, because neither the strain nor the temperature was uniform in the polymer melt being stretched. However, the test was useful in obtaining meaningful comparisons of the drawing behavior of different polymers. The measured force increased as the roller velocity is increased and then generally remained constant until the strand broke. Melt strength tests were conducted by piston extrusion of polymer melt through a die 2 mm in diameter at a piston speed of 2 mm/s, and at a melt temperature above the melting point of the polyolefin blend. A ratio is a convenient means of demonstrating the improvement in melt strength by the modification of the present invention. The ratio of the melt strength of the polyolefin blend modified with the addition of organically modified clay to form a polyolefin/clay nanocomposite to the melt strength of the polyolefin blend before such modification, as determined by tests with the Gottfert™ Rheotens Melt Tension instrument at a temperature above the melting point of the polyolefin blend, will preferably be at least about 1.5 and no more than about 15, preferably at least about 1.6 and no more than 14.

In the present invention, visual sag tests were also performed to simulate processing conditions during thermoforming. The resistance of the polyolefin to sagging under the force of gravity was measured as sag depth, which is defined as the measure of extensional deformation under gravitation at a given temperature. Thin sheets of approximately 1.3 millimeters (mm) thickness were compression molded and then placed on a can (16.5 centimeters in diameter) at either 170° C. or 190° C. for 10 minutes. The sag depth under gravity was measured with a ruler at the center point of the sag and reported in millimeters. For a sag test performed at higher temperatures (i.e., 30° C. above the melting point of polypropylene), the sag depth of the final polymer blend of the present invention should show a decrease of at least about 20 percent, preferably of at least about 33 percent over the sag depth of the polymer at the same conditions without the addition of the clay material.

In order to simulate biaxial stretching during processing, grids with the size of 1 centimeter×1 centimeter (cm) were drawn onto the polymer sheets prior to the sag test. After the sample was allowed to cool, a draw ratio was calculated as follows:

$$\text{draw ratio} = \frac{\text{length of the grid distance of the sagged sample}}{\text{length of the grid distance of the undeformed sample}}$$

The lower the draw ratio, the less extensional deformation the polyolefin undergoes during processing. Tearing and thinning are visual defects that may occur when polyolefins with high draw ratios are processed.

The clay nanocomposite-modified polyolefin blend of the invention is suitable for making articles by thermoforming or other processes that require high melt-strength. Such a nanocomposite blend is also useful for processes that require a consistently high melt strength over a broader range of processing temperatures than is seen with unmodified blends. In the present invention, articles can be manufactured in such processes at a temperature from about 2° C. to 40° C. above the melting temperature of the polyolefins used to form the clay nanocomposite-polyolefin blends of the invention.

This is demonstrated in the following examples, where viscosity, melt strength and sagging of nanocomposite-modified polyolefin blends are compared to standard, unmodified polyolefin blends.

EXAMPLES

The test specimens for the measurements of flexural modulus and Izod impact were prepared by injection molding using the Toshiba 120-ton Injection Molding Machine Model ISE120N-5A. The specimens were conditioned at room temperature (23° C.) for 48 hours before testing, as specified in the ASTM method.

The following measurement methods were used in the examples:

Low Shear [Pa·s] Low Shear Viscosity, measured on a capillary rheometer in Pascal seconds at 230° C. with a capillary die 15×1 mm, according to ASTM D-3835-96, at a shear rate of 10 1/s High Shear [Pa·s] High Shear Viscosity, measured on a capillary rheometer in Pascal seconds at 230° C. with a capillary die 15×1 mm, according to ASTM D-3835-96, at a shear rate of 1000 1/s Flex Modulus [MPa] Flexural Modulus, measured in mega Pascals at 23° C., according to ASTM D-790-99

Izod [J/m] Impact resistance, measured in J/m at 23° C. in a direction perpendicular to the flow, according to ASTM D-256-97; break type is reported as complete break (CB), partial break (PB), or no break (NB)

Melt Strength [cN] Melt strength as determined by a Gottfert™ Rheotens Melt Tension instrument that measures the force in centi-Newtons (cN) required to pull a polymer melt strand from a capillary die at constant acceleration at a temperature above the melting point of the polyolefin blend Melt Strength Ratio Ratio of the melt strength of the modified blend to the melt strength of the blend before modification measured at 220° C.

Sag Depth [mm] Measure of extensional deformation under gravitation at a given temperature as measured with a ruler at the center point of the sag and reported in millimeters during the visual sag test Draw Ratio Ratio of the length of the grid distance of the sagged sample to the length of the grid distance of the undeformed sample during the visual sag test Examples 1–3

Polyolefin/Clay Nanocomposites of the Invention

Three different formulations of the polyolefin/clay nanocomposite masterbatch were examined, as listed in Table I. The polypropylene was produced by AtoFina Petrochemicals of Houston, Tex. under the tradename HPP 3925WZ. The maleic anhydride modified polypropylene was produced by Crompton Corporation (formerly Uniroyal Chemical Company) of Greenwich, Conn. under the tradename Polybond 3150. The organically modified clay was produced by Southern Clay Products, Inc. of Gonzales, Tex. under the tradename Closite 6A.

Controls 1–3

Varying formulations of polypropylene and maleic-anhydride-modified polypropylene, as listed in Table I, were used as controls, to better illustrate the importance of the organoclay material in the final polymer blend. The polypropylene and the maleic-anhydride-modified polypropylene were the same materials as in Examples 1–3. The talc was produced by Specialty Minerals, Inc. of Bethlehem, Pa. under the tradename 609 Ultra Talc.

The samples in Tables I and II were prepared in a Leistritz 34 mm Twin Screw Laboratory Extruder Model LSM30.34. Table I also provides the results of the measurements of shear viscosity, flexural modulus and impact resistance on the materials described above. The masterbatches in Examples 1–3 showed dramatic improvement in shear viscosity at low shear rates over the controls. The masterbatch from Example 2 was utilized for the sag tests, the results of which are shown in Tables III and IV.

TABLE I

| Component (wt %) | Control 1 | Control 2 | Control 3 | Ex. 1 | Ex. 2 | Ex. 3 |
|---|---|---|---|---|---|---|
| PP-1 | 100 | — | — | — | 30 | 40 |
| PP-MA | — | 100 | 80 | 80 | 30 | 20 |
| Talc-1 | — | — | 20 | — | — | — |
| Organoclay-1 | — | — | — | 20 | 40 | 40 |
| Property | | | | | | |
| Low Shear [Pa · s] | 122.7 | 266 | 276 | 1483 | 1749 | 2076 |
| High Shear [Pa · s] | 48 | 54 | 54 | 61 | 76 | 86 |
| Flex modulus [MPa] | 2091 | 1932 | 3444 | 3602 | 4637 | 4672 |
| Izod [J/m] | 19(CB) | 22(CB) | 27(CB) | 11(CB) | 12(CB) | 13(CB) |

The higher shear viscosity at low shear rates of Examples 1 and 3 masterbatches is graphically depicted in FIG. 1. Shear viscosity of the blends at different shear rates was measured at 230° C. in a Kayness Galaxy V Capillary Rheometer Model D8052C. The capillary used has a length to diameter ratio of 15:1.

Example 4

Polyolefin/Clay Nanocomposite of the Invention

The polypropylene was produced by Basell North America, Inc. of Wilmington, Del. under the tradename HPP PH020. The maleic anhydride modified polypropylene was produced by Crompton Corporation (formerly Uniroyal Chemical Company) of Greenwich, Conn. under the tradename Polybond 3150. The organically modified clay was produced by Southern Clay Products, Inc. of Gonzales, Tex. under the tradename Closite 15A.

Example 5

Polyolefin/Clay Nanocomposite of the Invention

The polypropylene was produced by Solvay Polymers of Houston, Tex. under the tradename HP/P9000. The maleic anhydride modified polypropylene was produced by Crompton Corporation (formerly Uniroyal Chemical Company) of Greenwich, Conn. under the tradename Polybond 3150. The organically modified clay was produced by Southern Clay Products, Inc. of Gonzales, Tex. under the tradename Closite 15A.

Controls 4–6

The polypropylene was produced by Basell North America, Inc. of Wilmington, Del. under the tradename HPP PH020. The maleic anhydride modified polypropylene was produced by Crompton Corporation (formerly Uniroyal Chemical Company) of Greenwich, Conn. under the tradename Polybond 3150. The organically modified clay was produced by Southern Clay Products, Inc. of Gonzales, Tex. under the tradename Closite 15A. The talc was produced by Luzenac America of Englewood, Colo. under the tradename JetFill 700C.

TABLE II

| Component (wt %) | Control 4 | Control 5 | Control 6 | Ex. 4 | Ex. 5 |
|---|---|---|---|---|---|
| PP-2 | 60 | 60 | 40 | 40 | — |
| PP-3 | — | — | — | — | 40 |
| PP-MA | — | — | 20 | 20 | 20 |
| Talc-2 | 40 | — | 40 | — | — |
| Organoclay-2 | — | 40 | — | 40 | 40 |
| Porperty | | | | | |
| Low Shear [Pa · s] | 808 | 1084 | 767 | 1882 | 3702 |
| High Shear [Pa · s] | 71 | 66 | 84 | 78 | 138 |
| Melt strength [cN] 180° C. | 0.89 | 1.47 | 1.22 | 6.11 | — |
| Melt strength [cN] 200° C. | 0.96 | 0.61 | 0.95 | 4.94 | 7.82 |
| Melt strength [cN] 220° C. | 0.15 | 0.74 | 0.47 | 4.84 | 6.55 |

The results illustrate that the modification of the current invention significantly increased the processing window during manufacturing since the melt strength of the modified sample could be held to a consistently high level over a broader range of temperatures than the unmodified sample.

Figure 2:
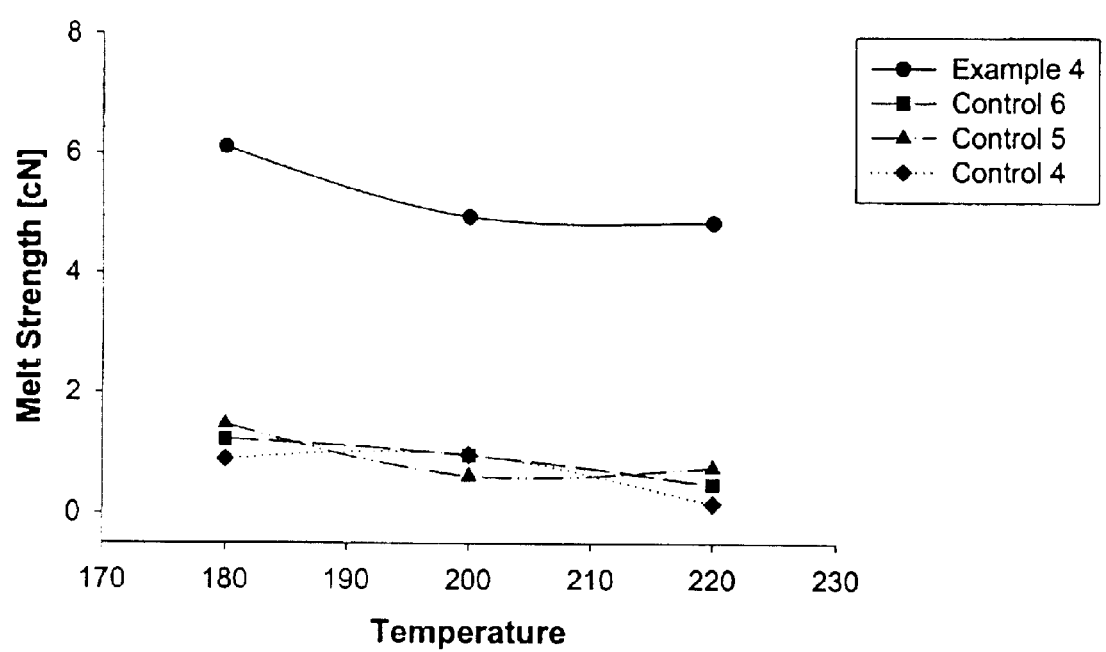
FIG. 2 is a graphical depiction of melt strength of the polyolefin/clay nanocomposite masterbatch over a range of processing temperatures as compared to controls.
Figure 4:
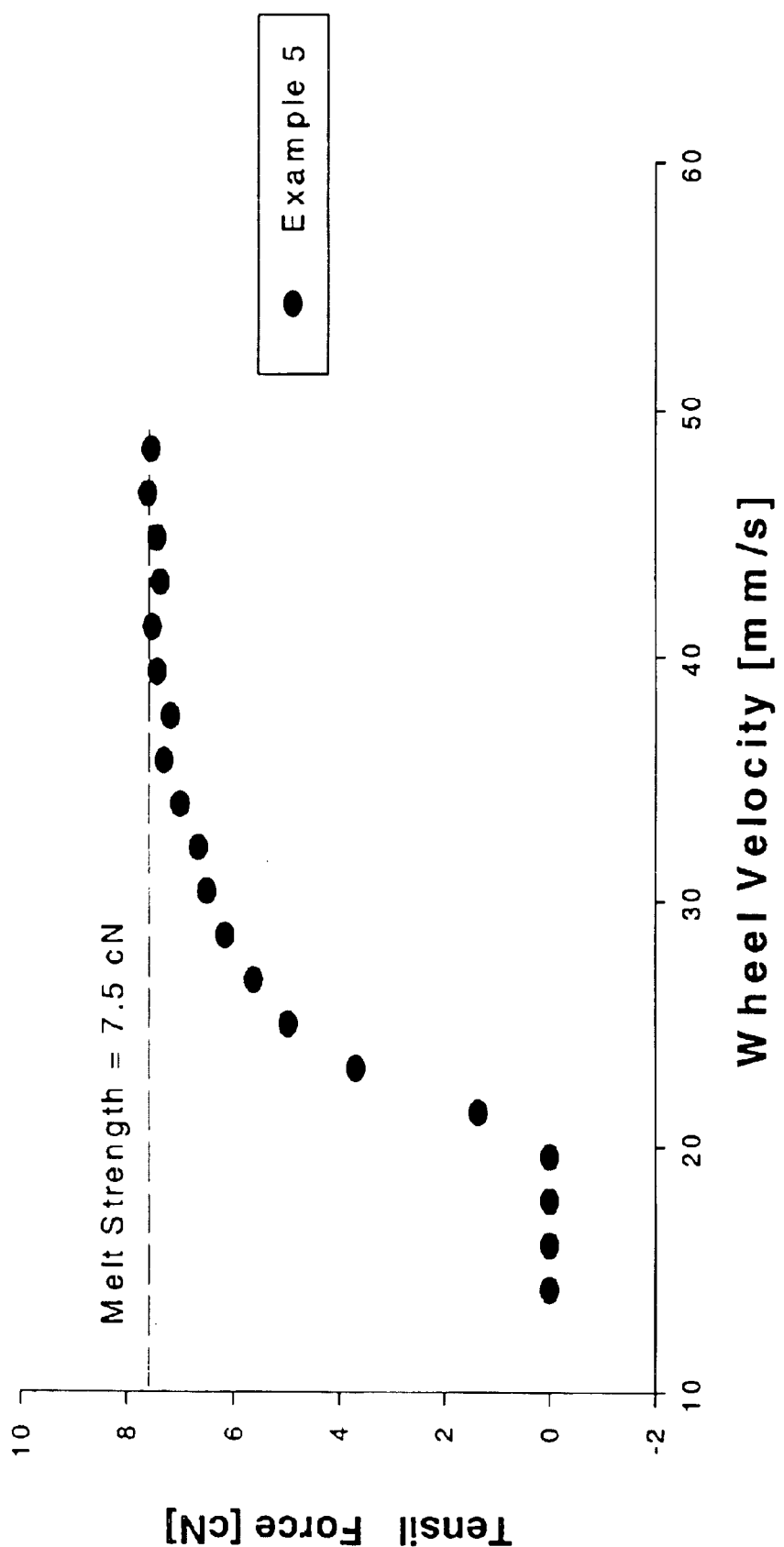
FIG. 4 is a graphical depiction of melt strength determination using Example 5.

FIG. 2 illustrates this improved processing window. The melt strength was measured in a Gottfert™ Rhetoens Melt Tension Instrument over a range of temperatures. FIG. 4 is a graphical depiction of the determination of melt strength for Example 5. The tensile force increases as the wheel velocity is increased and then generally remains constant until the strand breaks. Melt strength tests were conducted by piston extrusion of polymer melt through a die 2 mm in diameter at a piston speed of 2 mm/s, and at a melt temperature above the melting point of the polyolefin blend.

Examples 6–8

Polyolefin/Clay Nanocomposite of the Invention

In these examples, the final polymer blend was prepared in a two-step process, where the polyolefin/clay nanocomposite masterbatch of Example 2 was first compounded and then subsequently added to the final mixture of polypropylene and poly(ethylene-co-octene). The polypropylene was produced by AtoFina Petrochemicals of Houston, Tex. under the tradename HPP 3925WZ. The poly(ethylene-co-octene) was produced by DuPont Dow Elastomers LLC of Wilmington, Del. under the tradename Engage 8150. All processing was performed on a Haake Rheocord 9000 laboratory batch mixer. Formulations are listed in both Table III and Table IV.

Example 9

Polyolefin/Clay Nanocomposite of the Invention

In this example, the final polymer blend was prepared in a one-step process, where all components were mixed at the same time in a Haake Rheocord 9000 laboratory batch mixer. The polypropylene and the poly(ethylene-co-octene) were the same as in Examples 6–8. Formulations are listed in both Table III and Table IV.

Control 7

Polypropylene and poly(ethylene-co-octene), identical to those of Examples 6–8, were compounded on a Haake Rheocord 9000 laboratory batch mixer, without the addition of the polyolefin/clay nanocomposite, to provide a comparative example. Formulations are listed in both Table III and Table IV.

Control 8

A high-melt-strength polypropylene (HMS-PP) was compounded in a laboratory mixer with poly(ethylene-co-octene) to provide another comparative example. The HMS-PP was produced by Basell North America, Inc. of Wilmington, Del. under the tradename SD 613. It is not a polyolefin/clay nanocomposite. The poly(ethylene-co-octene) was the same as Examples 6–8. Formulations are listed in both Table III and Table IV.

TABLE III

| Component (wt %) | Control 7 | Control 8 | Ex. 6 | Ex. 7 | Ex. 8 | Ex. 9 |
|---|---|---|---|---|---|---|
| Poly(ethylene-co-octene) | 64 | 64 | 64 | 64 | 64 | 64 |
| PP in final blend | 36 | — | 31 | 26 | 16 | 26 |
| HMS-PP | — | 36 | — | — | — | — |
| Polyolefin nanocomposite | — | — | 5 | 10 | 20 | — |
| PP in nanocomposite | — | — | — | — | — | 3 |
| PP-MA | — | — | — | — | — | 3 |
| Organoclay-1 | — | — | — | — | — | 4 |
| Property | | | | | | |
| Sag Depth [mm] | 79 | 15 | 27 | 26 | 21 | 21 |
| Draw Ratio | 2.7 | 18 | 1.5 | 1.2 | 1.1 | 1.8 |
| Tearing and Thinning | No | Yes | No | No | No | No |

Figure 3A:
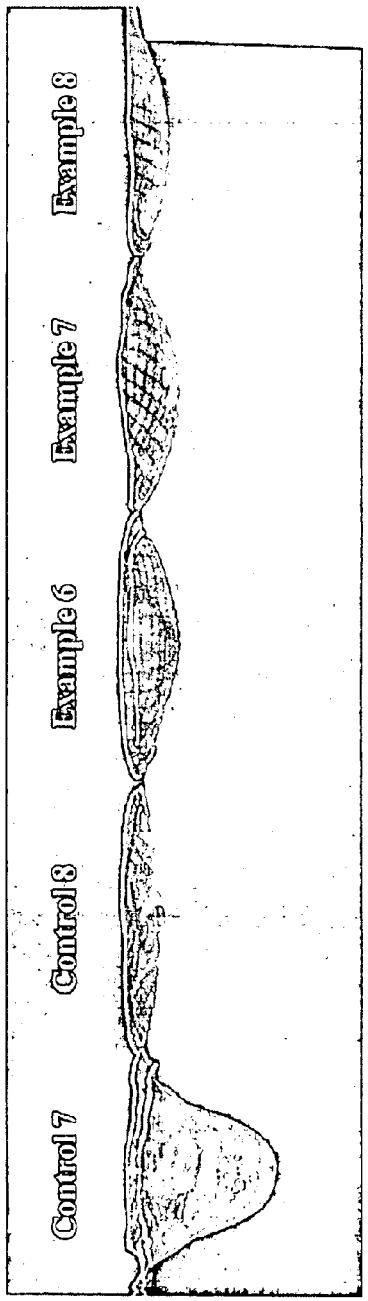
FIG. 3a is a photograph of sheets of material formed from Examples 6–8 and of Controls 7–8 after a sag test.
Figure 3B:
FIG. 3b is a photograph of a frontal view of Control 8 after a sag test, showing the thinning and tearing thereof.

Table III shows the results of the sag test at 190° C. (about 30° C. above the melting temperature of pure polypropylene. FIG. 3a pictures the sag test results for Examples 6–8 and Controls 7–8. The polyolefin/clay nanocomposite blends showed a significant decrease in sag depth and draw ratio compared to Control 7. The nanocomposite blends also performed better than the blend with HMS-PP (Control 8). Even though sagging was somewhat higher than Control 8 for the blends containing the nanocomposite, the draw ratio was minimal. In contrast, the draw ratio of the HMS-PP of Control 8 increased by a factor of 10 over the draw ratio of the nanocomposite-modified blends. Such deformation negatively affects the use of HMS-PP in complex molding configurations, i.e., those containing sinks, ribs and/or bosses. Also, tearing and thinning were observed on the HMS-PP sample, as shown in the front view of Control 8 in FIG. 3b. Such defects are presumably caused by a decrease in the elasticity of the HMS-PP sheet, which will in turn cause unacceptable irregularities in the finished articles. On the other hand, the nanocomposite-modified blends beneficially showed neither tearing nor thinning.

Table IV shows the results for the second sag test taken at 170° C. (near the melting temperature of pure polypropylene). Although the HMS-PP sample (Control 8) performed better at lower temperatures, it still exhibited a high draw ratio. Tearing and thinning were again observed in the HMS-PP sample. The polyolefin/clay nanocomposites had substantially the same properties as those from the higher temperature, showing that the heating processes of the invention could be performed over a commercially acceptable range of temperatures, i.e., a range at least twenty degrees greater than that of pure polypropylene, as evidenced by the examples in Tables III and IV.

TABLE IV

| Component (wt %) | Control 7 | Control 8 | Ex. 6 | Ex. 7 | Ex. 8 | Ex. 9 |
|---|---|---|---|---|---|---|
| Poly(ethylene-co-octene) | 64 | 64 | 64 | 64 | 64 | 64 |
| PP in final blend | 36 | — | 31 | 26 | 16 | 26 |
| HMS-PP | — | 36 | — | — | — | — |
| Polyolefin nanocomposite | — | — | 5 | 10 | 20 | — |
| PP in nanocomposite | — | — | — | — | — | 3 |
| PP-MA | — | — | — | — | — | 3 |
| Organoclay-1 | — | — | — | — | — | 4 |
| Property | | | | | | |
| Sag Depth [mm] | 28 | 10 | 31 | 25 | 17 | 20 |
| Draw Ratio | 2.8 | 3.4 | 1.8 | 1.2 | 1.1 | 1.2 |
| Tearing and Thinning | No | Yes | No | No | No | No |

Examples 10–11

Polyolefin/Clay Nanocomposite of the Invention

In these examples, the final polymer blend was prepared in a two-step process, where the polyolefin/clay nanocomposite masterbatch of Example 5 was first compounded and then subsequently added to the final mixture of polypropylene and poly(ethylene-co-octene). The polypropylene was produced by Solvay Polymers of Houston, Tex. under the tradename HP/P 9000. The poly(ethylene-co-octene) was produced by DuPont Dow Elastomers LLC of Wilmington, Del. under the tradename Engage 8180. All processing was performed on a Haake Rheocord 9000 laboratory batch mixer.

Example 12

Polyolefin/Clay Nanocomposite of the Invention

In this example, the final polymer blend was prepared in a one-step process, where all components are mixed at the same time in a Haake Rheocord 9000 laboratory batch mixer. The polypropylene and the poly(ethylene-co-octene) were the same as in Examples 10–11.

Control 9

Polypropylene and poly(ethylene-co-octene), identical to those of Examples 10–11, were compounded on a Haake Rheocord 9000 laboratory batch mixer, without the addition of the polyolefin/clay nanocomposite, to provide a comparative example. The talc was produced by Specialty Minerals, Inc. of Bethlehem, Pa. under the tradename 609 Ultra Talc.

Control 10

A high-melt-strength polypropylene (HMS-PP) was compounded in a laboratory mixer with poly(ethylene-co-octene) to provide another comparative example. The HMS-PP was produced by Basell North America, Inc. of Wilmington, Del. under the tradename SD 613. It is not a polyolefin/clay nanocomposite. The poly(ethylene-co-octene) was the same as Examples 10–11. The talc was produced by Specialty Minerals, Inc. of Bethlehem, Pa. under the tradename 609 Ultra Talc.

TABLE V

| Component (wt %) | Control 9 | Control 10 | Ex. 10 | Ex. 11 | Ex. 12 |
|---|---|---|---|---|---|
| Poly(ethylene-co-octene) | 64 | 64 | 64 | 64 | 64 |
| PP in final blend | 31 | — | 25 | 15 | 25 |
| HMS-PP | — | 31 | — | — | — |
| Polyolefin nanocomposite | — | — | 10 | 20 | — |
| PP in nanocomposite | — | — | — | — | 4 |
| PP-MA | — | — | — | — | 2 |
| Organoclay | — | — | — | — | 4 |
| Talc | 4 | 4 | — | — | — |
| Antioxidant Additive | 1 | 1 | 1 | 1 | 1 |
| Property |  |  |  |  |  |
| Melt Strength [cN] 220° C. | 1.1 | 2.1 | 3.2 | 3.6 | 3.8 |
| Melt Strength Ratio | N/A | N/A | 2.9 | 3.3 | 3.4 |

Figure 5:
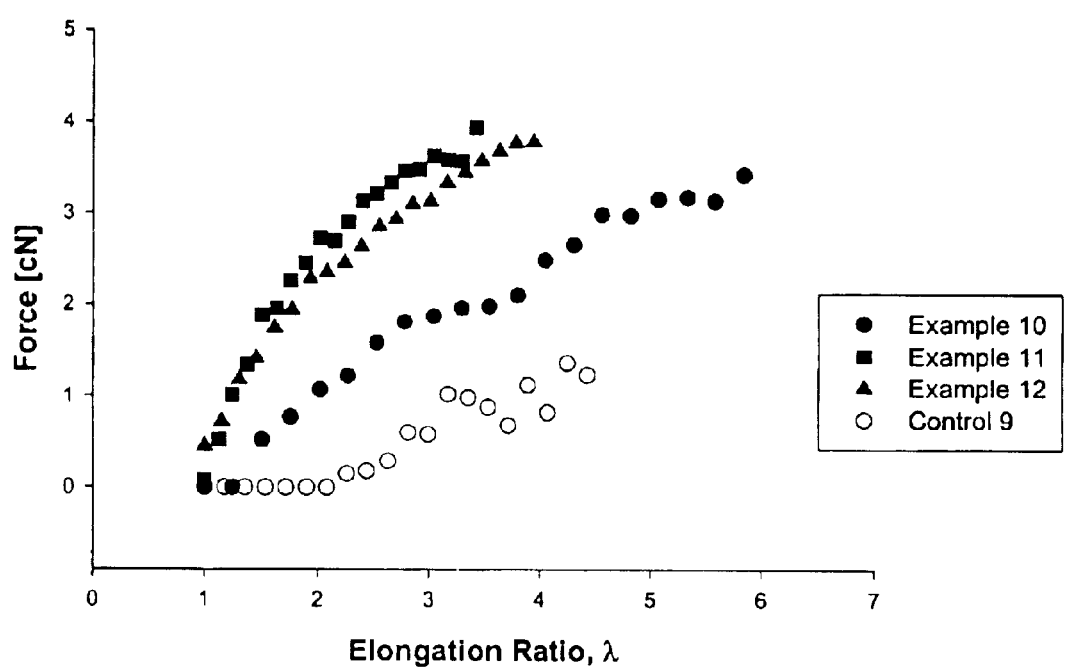
FIG. 5 is a graphical depiction of the tensile force of examples and controls as a function of elongation ratio, λ, for the rotating rollers on the Gottfert™ Rheotens Melt Tension instrument Model 10.1. The elongation ratio is defined as the ratio of the wheel velocity of the instrument's rotating rollers to the initial wheel velocity.

The ratio of the melt strength of the modified blend to the melt strength of the blend before modification is greater than 2. The melt strength ratio is calculated by dividing the melt strength of the example by the melt strength of the corresponding control sample. FIG. 5 graphically depicts the tensile force for Control 9 and Examples 10–12, measured in a Gottfert™ Rheotens Melt Tension experiment at 220° C., as a function of elongation ratio, λ. The elongation ratio is defined as the ratio of wheel velocity of the instrument's rotating rollers to initial wheel velocity.

Significant improvements in melt strength and sagging resistance were obtained by adding the polyolefin/clay nanocomposite in this fashion. This improvement in melt strength allows nonpolar polymers, particularly polyolefin blends, to be used in various commercial processes, including thermoforming, foaming, blow molding, and melt spinning applications for which typical polyolefins have unacceptable properties. The mechanical properties of the polyolefin/clay nanocomposite blends allow articles to be more easily manufactured by these processes in the normal manner.

The term "about," as used herein, should generally be understood to refer to both numbers in a range of numerals. Moreover, all numerical ranges herein should be understood to include each whole integer within the range.

Although preferred embodiments of the invention have been illustrated in the accompanying drawings and described in the foregoing Detailed Description of the Preferred Embodiments, it will be understood that the invention is not limited to the embodiments disclosed but is capable of numerous rearrangements and modifications of parts and elements without departing from the spirit of the invention. It will be understood that the chemical details of every design and embodiment may be slightly different or modified by one of ordinary skill in the art without departing from the blends and methods taught by the present invention claimed herein.

What is claimed is:

1. A method of manufacturing an article which comprises:
providing a polyolefin/clay nanocomposite masterbatch formed from about 0 to 99 percent by weight of polyolefin, from about 1 to 100 percent by weight of functionalized polyolefin, and from about 10 to 50 percent by weight of an organically modified clay;
melt blending from about 1 to 30 percent by weight of the nanocomposite masterbatch and from about 70 to 99 percent by weight of a polyolefin blend comprising a non-functionalized homopolymer or copolymer of propylene, and either (a) copolymer of ethylene and an alpha-olefin with an optional diene: or (b) a styrene copolymer of ethylene or propylene; or a mixture thereof, to form a final polyolefin blend and to ensure sufficient exfoliation of the organically modified clay into the final polyolefin blend so that the melt strength of the final polyolefin blend is greater than the melt strength of the polyolefin blend before modification with the nanocomposite masterbatch; and
forming the article using the final polyolefin blend.

2. The method of claim 1, wherein the masterbatch present in an amount from about 2 to 27 percent by weight and which comprises from about 50 to 80 percent by weight of polyolefin, from about 20 to 50 percent by weight of functionalized polyolefin, and from about 20 to 48 percent by weight of organically modified clay, and the polyolefin blend present in an amount from about 73 to 98 percent by weight, are melt blended to form the final polymer blend which has a modified melt strength so that the ratio of the modified melt strength to the melt strength before modification measured at 220° C. is at least about 1.5 but no more than about 15.

3. The method of claim 1, wherein the masterbatch present in an amount from about 3 to 25 percent by weight and which comprises from about 60 to 70 percent by weight of polyolefin, from about 30 to 40 percent by weight of functionalized polyolefin, and from about 30 to 45 percent by weight of organically modified clay, and the polyolefin blend present in an amount from about 75 to 97 percent by weight are melt blended to form the final polyolefin blend which has a modified melt strength so that the ratio of the modified melt strength to the melt strength before modification measured at 220° C. is at least about 1.6 but no more than about 14 and the final polyolefin blend has a shear viscosity that is at least about 5 times that of the shear viscosity of the polymer blend measured under the same conditions but without the organically modified clay.

4. A method of manufacturing an article which comprises a polyolefin/clay nanocomposite blend comprising:
   combining from about 50 to 98 percent by weight of a polyolefin comprising a non-functionalized homopolymer or copolymer of propylene, and either (a) copolymer of ethylene and an alpha-olefin with an optional diene; or (b) a styrene copolymer of ethylene or propylene; or a mixture thereof, from about 1 to 20 percent by weight of a functionalized polyolefin, and an organically modified clay in an amount sufficient to provide a modified melt strength, so that a ratio of the modified melt strength of the final polyolefin blend to the melt strength of the polyolefin blend before modification with the organically modified clay measured at 220° C. is at least about 1.5 but no more than about 15; and
   forming the article using the polyolefin/clay nanocomposite blend.

5. The method of claim 4, wherein the polyolefin blend in the article comprises from about 70 to 95 percent by weight of polyolefin, from about 1 to 10 percent by weight of functionalized polyolefin, and from about 4 to 20 percent by weight of organically modified clay to provide a ratio of the melt strength of the modified blend to the melt strength of the blend before modification measured at 220° C. of at least about 1.6 but no more than about 14.

6. The method of claim 4, wherein the polyolefin blend in the article comprises from about 85 to 92 percent by weight of polyolefin, from about 2 to 5 percent by weight of functionalized polyolefin, and from about 6 to 10 percent by weight of organically modified clay to provide a ratio of the melt strength of the modified blend to the melt strength of the blend before modification measured at 220° C. of at least about 1.6 but no more than about 14.

7. The method of claim 1 wherein the forming comprises at least one of thermoforming, extrusion, melt spinning, blow molding or foam processing.

8. An article formed from a final polyolefin blend containing a polyolefin/clay nanocomposite masterbatch comprising:
   from about 0 to 99 percent by weight of polyolefin from about 1 to 100 percent by weight of a functionalized polyolefin, and from about 10 to 50 percent by weight of an organically modified clay, and any optional additive components,
   wherein the final polyolefin blend comprises from about 1 to 30 percent by weight of the nanocomposite masterbatch and about 70 to 99 percent by weight of a polyolefin blend comprising a non-functionalized homopolymer or copolymer of propylene, and either (a) copolymer of ethylene and an alpha-olefin with an optional diene; or (b) a styrene copolymer of ethylene or propylene; or a mixture thereof, and
   wherein the organoclay is sufficiently exfoliated into the polyolefin blend to provide the final polyolefin blend with a modified melt strength so that the ratio of the modified melt strength of the final polyolefin blend to the melt strength of the polyolefin blend before modification with the organically modified clay measured at 220° C. is at least about 1.5 but no more than about 15.

9. The article of claim 8, wherein the masterbatch is present in an amount from about 2 to 27 percent by weight and comprises from about 50 to 80 percent by weight of polyolefin, from about 20 to 50 percent by weight of functionalized polyolefin, and from about 20 to 48 percent by weight of organically modified clay, and the polyolefin blend is present in an amount from about 73 to 98 percent by weight, to form the final polymer blend which has a modified melt strength so that the ratio of the modified melt strength to the melt strength before modification measured at 220° C. is at least about 1.5 but no more than about 15.

10. The article of claim 8, wherein the masterbatch is present in an amount from about 3 to 25 percent by weight and comprises from about 60 to 70 percent by weight of polyolefin, from about 30 to 40 percent by weight of functionalized polyolefin, and from about 30 to 45 percent by weight of organically modified clay, and the polyolefin blend is present in an amount from about 75 to 97 percent by weight, to form the final polyolefin blend which has a modified melt strength so that the ratio of the modified melt strength to the melt strength before modification measured at 220° C. is at least about 1.6 but no more than about 14 and the final polyolefin blend has a shear viscosity that is at least about 5 times that of the shear viscosity of the polymer blend measured under the same conditions but without the organically modified clay.

11. The article of claim 8, wherein the functionalized polyolefin comprises a homopolymer or copolymer of propylene, a homopolymer or copolymer of ethylene, or a mixture thereof, wherein a functional monomer with a pendant reactive polar group is grafted onto the polyolefin.

12. The article of claim 8, wherein the nanocomposite-modified polyolefin blend further comprises one or more optional additive components including nucleating agents, fillers, plasticizers, impact modifiers, colorants, mold release agents, lubricants, antistatic agents, pigments, fire retardants, and ultraviolet stabilizers, or mixtures thereof, and the alpha-olefin comprises octene.

13. The article of claim 8, wherein the addition of the nanocomposite masterbatch provides a range of temperatures for forming the article that is at least about 10° C. greater than without the inclusion of a sufficient amount of the clay nanocomposite.

14. An automotive component, a building material, a packaging material, an electrical material, or a nonwoven fabric or fiber comprising the article of claim 8.

15. An article formed from a modified polyolefin blend comprising from about 50 to 98 percent by weight of polyolefin comprising a non-functionalized homopolymer or copolymer of propylene, and either (a) copolymer of ethylene and an alpha-olefin with an optional diene; or (b) a styrene copolymer of ethylene or propylene; or a mixture thereof, from about 1 to 20 percent by weight of functionalized polyolefin, and from about 1 to 30 percent by weight of organically modified clay that is sufficiently dispersed in the polyolefin and functionalized polyolefin to provide a modified melt strength of the final polyolefin blend that is greater than the melt strength of the polyolefin blend before modification with the or organically modified clay.

16. The article of claim 15, wherein the polyolefin blend comprises from about 70 to 95 percent by weight of polyolefin, from about 1 to 10 percent by weight of functionalized polyolefin, and from about 4 to 20 percent by weight of organically modified clay.

17. The article of claim 15, wherein the polyolefin blend comprises about 85 to 92 percent by weight of polyolefin, from about 2 to 5 percent by weight of functionalized polyolefin, and from about 6 to 10 percent by weight of organically modified clay.

18. The article of claim 15, wherein the polyolefin blend has a ratio of the melt strength of the modified blend to the melt strength of the blend before modification measured at 220° C. of at least about 1.5 but no more than about 15.

19. The article of claim 15, wherein the polyolefin blend has a ratio of the melt strength of the modified blend to the melt strength of the blend before modification measured at 220° C. of at least about 1.6 but no more than about 14.

20. The article of claim 15, wherein the organically modified clay comprises a reaction product of at least one organoclay and at least one swelling agent.

21. The article of claim 20, wherein the swelling agent comprises at least one of cationic surfactants; amphoteric surface active agents; derivatives of aliphatic, aromatic or arylaliphatic amines, phosphines and sulfides; organosilane compounds; protonated amino acids and salts thereof; and combinations thereof.

22. A method of manufacturing an article which comprises:

providing a polyolefin/clay nanocomposite masterbatch formed from about 0 to 99 percent by weight of polyolefin, from about 1 to 100 percent by weight of functionalized polyolefin, and from about 10 to 50 percent by weight of an organically modified clay that comprises a smectite clay that has been ion-exchanged and intercalated with a quaternary ammonium compound of the formula: $(R)_n(CH_3)_m N^+ Cl^-$, where R represents a hydrogenated tallow moiety, n is 1 to 4, m is 0 to 3 with the proviso that n+m=4;

melt blending from about 1 to 30 percent by weight of the nanocomposite masterbatch and from about 70 to 99 percent by weight of a polyolefin blend comprising a functionalized homopolymer or copolymer of propylene, and either (a) copolymer of ethylene and an alpha-olefin with an optional diene; or (b) a styrene copolymer of ethylene or propylene; or a mixture thereof, to form a final polyolefin blend and to ensure sufficient exfoliation of the organically modified clay into the final polyolefin blend so that the melt strength of the final polyolefin blend is greater than the melt strength of the polyolefin blend before modification with the nanocomposite masterbatch; and forming the article using the final polyolefin blend.

* * * * *

UNITED STATES PATENT AND TRADEMARK OFFICE
CERTIFICATE OF CORRECTION

PATENT NO. : 6,770,697 B2
DATED : August 3, 2004
INVENTOR(S) : Drewniak et al.

It is certified that error appears in the above-identified patent and that said Letters Patent is hereby corrected as shown below:

Title page,
Item [56], References Cited, U.S. PATENT DOCUMENTS, after
"6,380,295 B1   04/2002         Ross et al. .... 524/443" insert
-- 6,407,155 B1 3/2000         Qian et al. .... 524/445 --.
FOREIGN PATENT DOCUMENTS, after "JP 51075761 A 3/1976", insert
-- WO   WO 99/47598   3/1999 --.
OTHER PUBLICATIONS, "Galgali" reference, change "Galgali, O., et al." to
-- Galgali, G., et al. --.

Column 22,
Line 57, before "organically modified clay", delete "or".

Signed and Sealed this

Fourth Day of October, 2005

JON W. DUDAS
*Director of the United States Patent and Trademark Office*